UNITED STATES PATENT OFFICE.

EDWARD GOODRICH ACHESON, OF STAMFORD TOWNSHIP, WELLAND COUNTY, ONTARIO, CANADA.

METHOD OF PREPARING NON-AQUEOUS MIXTURES AND PRODUCT THEREOF.

No. 911,358.     Specification of Letters Patent.     Patented Feb. 2, 1909.

Application filed October 28, 1907. Serial No. 399,486.

*To all whom it may concern:*

Be it known that I, EDWARD GOODRICH ACHESON, a citizen of the United States, residing at Stamford township, in the county of Welland, Province of Ontario, Canada, have invented certain new and useful Improvements in Methods of Preparing Non-Aqueous Mixtures and Products Thereof, of which the following is a specification.

In my prior patent, No. 843,426, granted February 5, 1907, I have described and claimed a method of disintegrating and deflocculating amorphous bodies by incorporating with them a solution having effects thereon like those due to tannin. The method of deflocculation is usually practiced by incorporating with the amorphous body an aqueous solution containing tannin or equivalent reagent, and the resulting deflocculated material is so finely subdivided as to be capable of remaining in suspension for an indefinite period, and of passing through the finest filter paper. For many applications it is desirable to effect a transfer of an amorphous body which has undergone deflocculation in an aqueous solution or medium, to a non-aqueous medium, and more particularly such as are immiscible with water. My present invention relates to the method of effecting such transfer, and to the preparation of non-aqueous mixtures, such as pastes, suspensions or the like.

For a full understanding of my invention I will refer as one specific instance thereof to the preparation of a lubricant by deflocculating graphite in presence of an aqueous solution of tannin, gallotannic acid or equivalent reagent, and subsequently transferring the deflocculated graphite to a non-aqueous medium, as oil. The deflocculation of graphite may be accomplished in the manner described in my prior patent, No. 844,989, granted February 19, 1907, by adding to an unctuous graphite a solution of tannin, gallotannic acid or equivalent reagent, the deflocculating or modifying agent being added to the graphite in proportion to form a suitable paste, and worked or agitated therewith. Or a paste in an aqueous medium may be otherwise prepared, as by collecting graphite deflocculated in presence of a relatively large proportion of an aqueous solution by filtering the same through suitable filtering media as described in my Patent No. 895,063, granted August 4, 1908.

In effecting a transfer of the deflocculated graphite from the aqueous medium to a non-aqueous medium it is essential that no desiccation or drying of the graphite as by application of heat should intervene, as such desiccation or drying would result in the flocculation of the graphite. The transfer may be effected by the application of a vehicle miscible both with water and with oil, as described and claimed in my co-pending application, Ser. No. 377,561, filed June 6, 1907; or it may be effected by directly displacing all or substantially all of the water by means of oil.

In proceeding according to the last mentioned method the paste containing an aqueous medium is worked or macerated for a considerable time in the presence of oil, the working being effected by suitable mechanical devices, when it will be found that the water or aqueous solution or medium has been displaced by the oil and may be poured off from the oil-paste or otherwise separated from it. The oil may be added in bulk or at intervals during the continuance of the working, the latter method being deemed preferable in most cases. The working or maceration should continue until a substantially complete displacement of the aqueous medium has been secured. As a rule the separation or displacement of the aqueous medium will be found to occur quite suddenly after a more or less prolonged treatment according to the conditions of the operation. The time of treatment may be somewhat shortened by adding to the mixture undergoing working a proportion of a previously formed oil-paste. At the completion of the operation the paste will be found to consist substantially of graphite and oil, and to be substantially free from water, and if a suitable proportion of the paste be added to further quantities of oil or of other non-aqueous media miscible with oil, the graphite will be found to diffuse readily therethrough and to remain in suspension therein.

While I have described as a specific example of my invention the transfer of graphite in its deflocculated state from an aqueous medium to oil, I desire it to be understood that the method is applicable generally to amorphous bodies for transferring the same from an aqueous medium to any non-aqueous medium. Thus I have prepared inks, paints and the like by transferring lamp black or other amorphous pigments, previously deflocculated in presence of water, to a suitable non-aqueous vehicle or medium, as linseed oil, suitable varnishes and the like, the method of procedure being substantially as described above for the treatment of graphite.

I claim:

1. The method of preparing non-aqueous mixtures, which consists in deflocculating an amorphous body in presence of water, and then replacing the water by a non-aqueous medium.

2. The method of preparing non-aqueous mixtures which consists in deflocculating an amorphous body and preparing a paste containing such deflocculated body and water, and then working said paste in presence of a non-aqueous medium to displace water.

3. The method of preparing non-aqueous mixtures, which consists in preparing a paste containing a deflocculated amorphous body, water, and a deflocculating agent, and then working said paste in presence of a non-aqueous medium to displace water.

4. The method of preparing non-aqueous mixtures containing deflocculated graphite which consists in deflocculating graphite in presence of water, and then replacing the water by a non-aqueous medium.

5. The method of preparing an oil-paste containing deflocculated graphite, which consists in preparing a paste containing deflocculated graphite and water and then displacing the water from said paste by oil.

6. A new article of manufacture, a substantially water-free paste or mixture consisting essentially of a deflocculated amorphous body and a non-aqueous medium.

7. A new article of manufacture, a substantially water-free paste or mixture consisting essentially of deflocculated graphite and oil.

In testimony whereof, I affix my signature in presence of two witnesses.

EDWARD GOODRICH ACHESON.

Witnesses:
PETER P. APLY,
F. A. SCHUMACHER.